United States Patent [19]

Schlueter

[11] 4,134,265

[45] Jan. 16, 1979

[54] METHOD AND SYSTEM FOR DEVELOPING GAS PRESSURE TO DRIVE PISTON MEMBERS

[76] Inventor: William B. Schlueter, Rte. 1, Box 174, Big Pine Key, Fla. 33043

[21] Appl. No.: 790,970

[22] Filed: Apr. 26, 1977

[51] Int. Cl.² .......................... F03G 7/06; F01B 29/00
[52] U.S. Cl. ....................................... 60/516; 60/682; 60/650
[58] Field of Search .................. 60/530, 650, 682, 516

[56] References Cited

U.S. PATENT DOCUMENTS

| | | | |
|---|---|---|---|
| 2,164,134 | 6/1939 | Hahnle | 60/650 X |
| 2,829,501 | 4/1958 | Walls | 60/650 X |

Primary Examiner—Allen M. Ostrager
Attorney, Agent, or Firm—James A. Wong

[57] ABSTRACT

Method for developing gas pressure to drive an engine consisting of establishing equal cooperating gas portions in separate containers a close circuit; developing pressure change in one of the portions by changing temperature; establishing communication between containers, allowing pressure equalization in containers by gas flow from container given greater pressure to the other; cutting communication between containers after pressure equalization; redeveloping gas pressure change in one container, obtaining relative pressure increase in the container to which gas flowed by changing the temperature in one container; and driving an engine by establishing gas flow communication between the containers through the engine. System comprising pairs of equal capacity gas containers in a circuit, a tube extending between inlet and outlet of each container, and heat exchanger for changing gas temperature; fluid ducts connecting the each container heat exchanger; hot and cold fluid supply lines leading to one duct; hot and cold fluid return lines leading from another duct; individual supply valves selectively connecting hot fluid and cold fluid supply lines to the first duct; individual return valves selectively connecting hot and cold fluid return line from the second duct; mechanism selectively causing supply and return valves of one container to connect hot fluid supply and return lines to the first and second ducts thereof to heat the gas, increase pressure, causing supply and return valves of the other container to connect cold supply and return lines to first and second ducts to cool the gas, reduce pressure; close circuit passage from each container outlet to an engine and back to the inlet of each container; and by-pass passage across the closed circuit for connecting each container outlet to the other container inlet to establish intercommunication between the containers exclusive of the engine.

18 Claims, 3 Drawing Figures

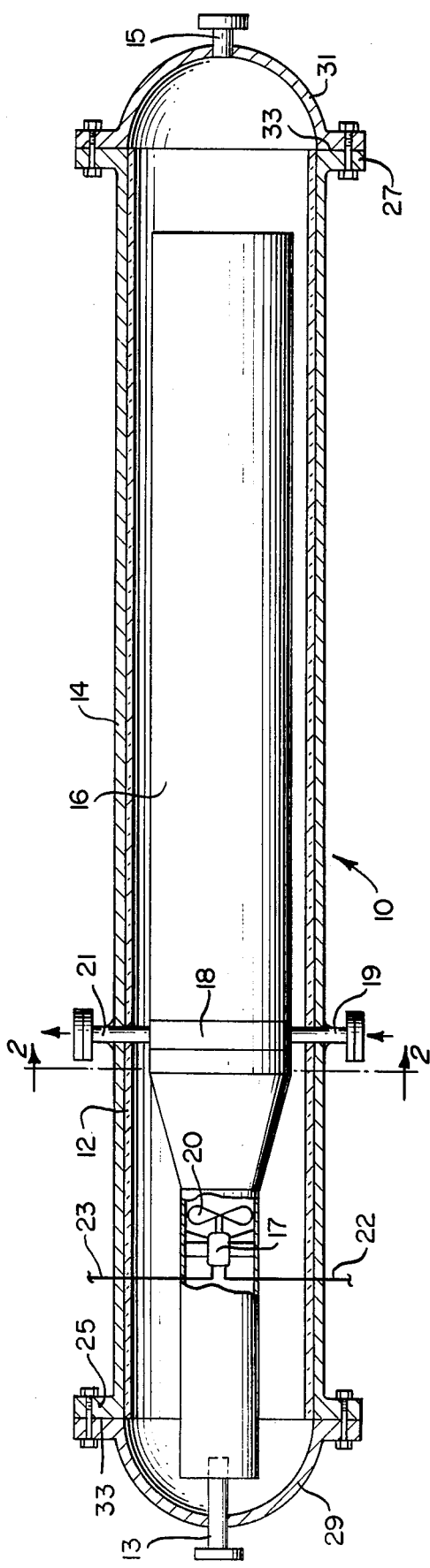

METHOD AND SYSTEM FOR DEVELOPING GAS PRESSURE TO DRIVE PISTON MEMBERS

FIELD OF THE INVENTION

This invention is directed to a method and system in which known and well-recognized principles of physical science are combined and applied in a new manner to produce work output. In particular, this invention is directed to the use of principles commonly referred to as Boyle's and Charles' laws to produce useful energy.

BACKGROUND OF THE INVENTION

The present invention was developed in an endeavor to avoid and/or overcome energy crises or fuel shortages such as those resulting in long service station lines for gasoline and sharp increases in fuel costs in the recent past. With the foregoing in mind the present invention was developed in order to more efficaciously extract useful power from available energy sources.

The present invention thus has as an object the development of a method of increasing the useful energy obtainable from available energy sources.

Another object of the present invention is to provide a system whereby the method of increasing the useful energy obtainable from available energy sources mentioned above may be carried into effect.

Yet another object of the present invention is to provide a system incorporating numerous alternate power sources of different types whereby maximum conservation of energy sources may be achieved in spite of the on-going use of energy to satisfy human demands.

Still another object of this invention is to provide a method and system of such versatility that where one source of energy must be curtailed for whatever reason, work output may be continuous by readily switching to a built-in alternative energy source from the curtailed source.

SUMMARY OF THE INVENTION

With the foregoing background in mind, applicant has devised the method and system disclosed herein for developing gas pressure to produce useful work output by way of driving one or more piston in an engine or like machine. While the method and/or system of producing useful work according to the present invention in essence is based upon the principles commonly known as Boyle's and Charles' laws, the present invention in fact relates to a new and unknown application of the principles of Boyles' and Charles' laws in such a sequence of steps and in such a system to produce beneficial results hitherto unattained and unthought of in the exploitation of efficient work output from available energy sources. With due consideration of Boyles' and Charles' laws and the implications thereof, (1) that the volume of a certain mass of gas is proportional to the pressure at constant temperature; (2) that the volume of a given mass of gas is directly proportional to the absolute temperature, at constant pressure; and (3) that the pressure of a given mass of gas is directly proportional to the absolute temperature if the volume does not change; applicant has by using specially designed gas pressure tanks with heat exchangers arranged in combination with certain controls created pressure variations on a given volume of gas by varying the gas temperature. In carrying out the present invention, the tanks are used in pairs with the gas in one tank being cooled while the gas in the other tank is heated to develop a pressure differential therebetween, which according to the gas laws will be directly proportional to the absolute temperature differential. Controlled communication between tanks will produce flow to one of the tanks with an increase in mass of gas therein and followed by a second development of gas differential pressure, the gas is released for communication with a piston to produce a work stroke thereon. In a given example of the use of the method and system of this invention, three sets of pairs of tanks may be combined to drive the pistons of a three piston engine in timed sequence relationship wherein a constant supply of gas would be available the required differential pressure. Heat to develop pressure differential between the gas pressure tanks of each set may be supplied by solar, geothermal, atmospheric sources, by waste heat from an engine, by a boiler or other heat producing apparatus.

The gas pressure tank according to the present invention may, for example, take the form of a cylindrical tank with sufficient shell thickness to withstand the pressures to be developed.

Gas pressure differential between each pair of tanks is developed by cooling and/or heating of the gas by supplying a heat exchanger with cooling and/or heating water or fluid through liquid inlet and outlet connections, respectively.

The pressure differential is obtained by first filling both tanks of each set to a predetermined pressure, equalizing, then by cooling one tank and/or heating the other tank to the operating temperatures and allowing them to again equalize there will be a greater mass of gas in one tank than in the other tank. Upon equalization the process is reversed so that the tank previously cooled is heated and vice versa. When a second pressure differential that is developed reaches a set point between two tanks of one set, then tanks of a second set will start supplying gas to the system thus assuring a continuous supply of gas at the required pressure differential. The power take-off may be a direct gas driven engine, a hydraulic system, or any type that may utilize the pressure differential obtained.

In carrying out the present invention, the tank pressure is equalized after each cycle to allow the high pressure gas from the hot tank to flow into the cold tank until both tanks of each set are equalized so that maximum pressure is obtained with a minimum of temperature differential since there will as a matter of course be a greater mass of gas in one tank than the other. By using a high static pressure on the gas and by delivering the gas through a pressure reducing valve, a greater volume of gas of optimum pressure differential may be obtained to drive a power take-off system than any previously known system. Moreover, by using the proper gas in the system disclosed herein, more power will be made available with less energy input than from any comparable system known heretofore.

BRIEF DESCRIPTION OF THE DRAWINGS

FIG. 1 shows a side elevational view in section of a tank which is used in the system to carry out the method of the invention;

FIG. 2 is a sectional view taken along line 2—2 and looking in the direction of the arrows in FIG. 1.

DETAILED DESCRIPTION OF THE INVENTION

Figure 3:
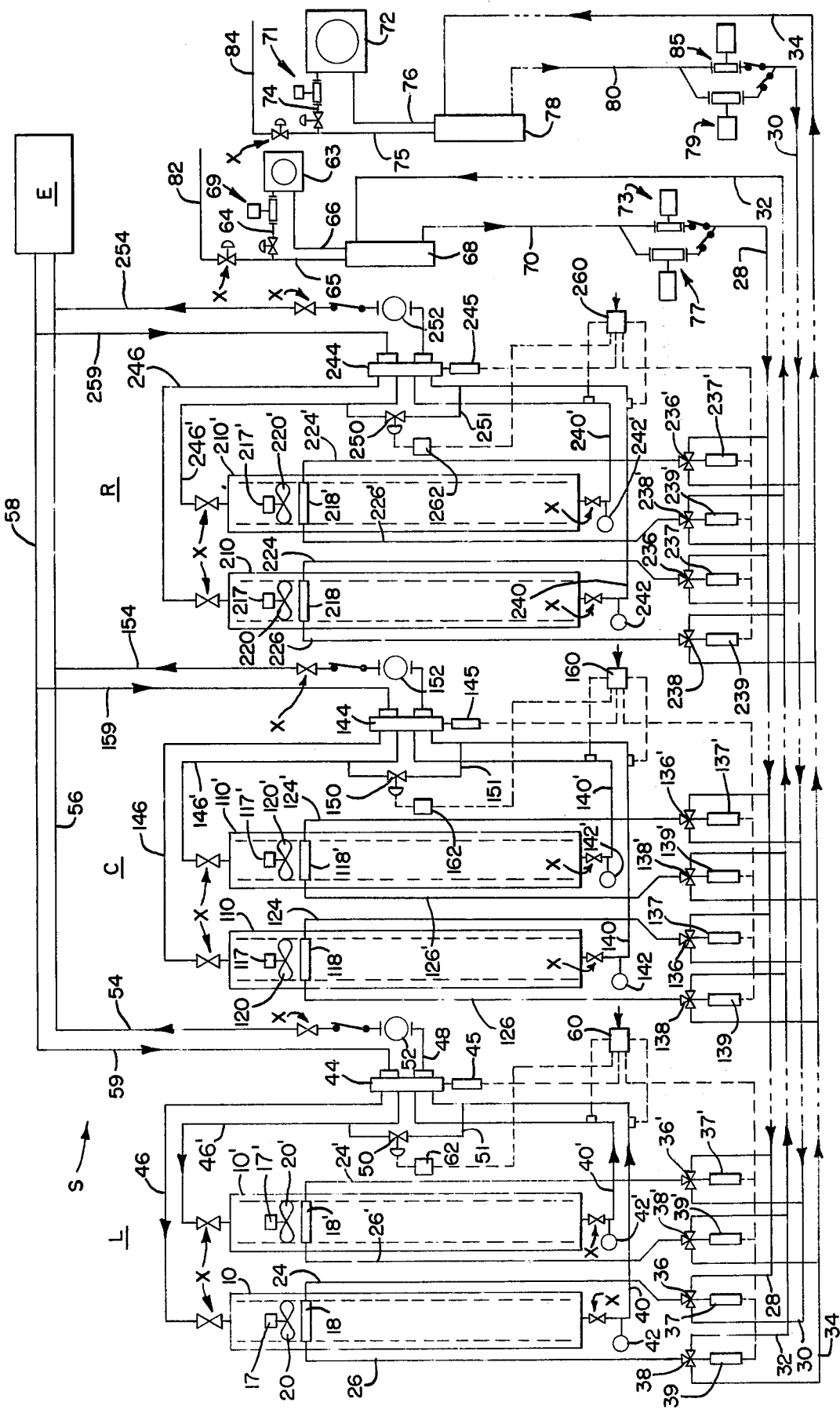
FIG. 3 represents one example of the system whereby the disclosed invention may be carried into operation.

Referring now in detail to the drawings and with particular reference to FIGS. 1-3, the reader will readily appreciate the concept of the present invention, the method and system by which the objectives of the invention may be carried into effect and its advantages over that of the known prior art. Thus, from FIGS. 1 and 2, the details of a gas receiving tank or container 10 may be seen as representative of each of a plurality of tanks 10, 10'; 110, 110'; 210, 210' used in pairs in the system S at a left station L; a center station C; and a right station R as illustrated in FIG. 3 to carry into operation the method of developing gas pressure to drive a piston or like members of an engine E or the like according to the present invention. Tank or container 10 as seen in FIGS. 1 and 2 may be generally cylindrical in shape and, of course, must be of sufficient shell thickness to withstand the operational pressures exerted thereon in the system S in the development of pressure to drive engine E or the like.

Insulation in the form of a shroud 12 is provided on the inside of container or tank 10 to minimize heat loss from the gas medium through wall 14 of container 10. A tubular passage 16 facilitating the flow of gas through is provided in the center of container 10. Passage 16 encloses a fin tube type heat exchanger 18 with a fan 20 mounted therein to circulate the gas through the heat exchanger 18 and passage 16. An inlet 13 for admitting a gas working medium into the tank 10 is provided so that the gas must pass through the passage 16 and through the fin tube heat exchanger 18. The fan 20 is shown to be driven by motor 17. Depending on the type of gas used in the system S, motor 17 may be electric, hydraulic or pneumatic. For instance, where hydrogen gas is the working medium in system S, drive motor 17 for fan 20 should be of the hydraulic or pneumatic type with fluid supply and exhaust lines 22 and 23, respectively. Where helium, nitrogen or other inert gas is the working medium, motor 17 may be electrical with lines 22, 23 being electrical leads.

Cooling and/or heating of the gas is accomplished by fin tube heat exchanger 18 that is heated or cooled with heating or cooling water or other fluid supplied through heat transfer fluid inlet and outlet connections 19 and 21, respectively. Pressurized gas may pass out of tank 10 through gas outlet 15.

Tank 10 is provided with flanges 25, 27 at opposite ends thereof to which end caps 29, 31 are removably secured. Caps 29, 31 are removable for purposes of access. Proper operation is ensured by suitable seals 33 between the flange and cap connections. One fin coil heat exchanger 18 is shown in the drawing, however, depending on the temperature of the heat exchange fluid several tubular type heat exchangers 18 may be employed in each tank 10.

The system S whereby gas pressure may be developed to drive an engine or like machine according to the present invention as illustrated schematically in FIG. 3 will now be described with respect to tanks 10 and 10' at station L and it is to be understood that tanks 110 and 110' at station C and tanks 210 and 210' at station R will be associated with parts similar to those described in connection with parts at station L, but having reference numerals increased by 100 and 200, respectively. Tanks 10 and 10' at position L are of the structure such as described above in connection with FIGS. 1 and 2. The containers tank 10 and 10' at L are of substantially equal capacity. Heat exchangers 18 and 18' whose inlet ducts 24 and 24' outlet ducts 26 and 26' may be seen to be connected to each heat exchanger 18 and 18' to supply heating or cooling fluid medium as desired. The system S includes a hot fluid supply line 28, a cold fluid supply line 30, a hot fluid return line 32 and a cold fluid return line 34 to serve the heat exchangers 18 and 18' of tanks 10 and 10'. The fluid lines 28, 30, 32 and 34 have fluid flowing therethrough in the direction indicated by arrow heads. Three way supply valves 36 and 36' are provided to selectively connect either hot fluid supply line 28 or cold fluid supply line 30 to heat exchanger inlet ducts 24 and 24' of tanks 10 and 10' while at the same time two way return valves 38 and 38' selectively connect hot fluid return line 32 or cold fluid return line 34 to heat exchanger outlet duct 26 and 26'. When heat exchanger inlet and outlet ducts 24, 26 of one tank 10 of each pair are selectively connected to hot fluid lines 28, 32 by valves 36, 38 respectively, the heat exchanger inlet and outlet ducts 24', 26' of the other tank 10' of the pair are selectively connected to cold fluid lines 30, 34 by valves 36', 38' thereof, respectively, and vice versa.

Actuators 37 and 39, which may be of any known type, such as those of pneumatic, hydraulic or solenoid construction are provided to effect switching of valves 36 and 38, respectively. Actuator 37 in operation is effective to selectively switch valve 36 between positions connecting inlet duct 24 with hot or cold fluid supply lines 28, 30, respectively. Actuator 39, on the other hand, is effective in operation to selectively switch valves 38 between positions connecting outlet duct 26 with hot or cold fluid return lines 32, 34, respectively. Actuators 37' and 39' are similar to actuators 37 and 39 and effect switching of valves 36' to connect duct 24' with lines 28 or 30 and valve 38' to connect duct 26' with lines 32 or 34. At the outlet end of one of the container 10, for example the left container at station L, is a first outlet duct 40 provided with a pressure gauge 42 connected thereto, and at the outlet end of the other tank or container 10' is another outlet duct 40' with a pressure gauge 42' connected thereto. Outlet ducts 40 and 40' are connected to a four-way valve 44. Also connected to the four-way valve 44 are inlet duct 46 connected to one of the tanks 10 on the left at station L and inlet duct 46' connected to the other tank 10' at station L. Additionally, an outlet duct 48 is connected to the four-way valve whereby gas may be supplied to drive an engine E. Further, a return line 58 from the engine E is connected to the four-way valve 44 by way of unit return duct 59. The four-way valve 44 is operative to selectively supply gas from one or the other of tanks 10 at station L to engine E via duct 48 and to return energy expended gas from the engine E to the other tank 10' at station L. The four-way valve 44 is also effective to allow gas to by-pass the engine E from one tank 10 to the other tank 10' or from the other tank 10' to the one tank 10.

A by-pass conduit 51 connects outlet duct 40 of tank 10 to inlet duct 46' of tank 10' whereby gas may pass from tank 10 to tank 10' or vice versa, depending upon which of tanks 10 and 10' has the greatest pressure therein, so that the differential pressure between tanks 10 and 10' may be equalized. Interposed in the passage or conduit 51 between outlet duct 40 and inlet duct 46' is an equalizing valve 50 which is selectively opened or closed by a changeover control element 60 which operates in response to a predetermined pressure differential build-up between tanks 10 and 10', the respective pressure of which may be read on pressure gauges 42 and 42' disposed on outlet ducts 40, 41', respectively. Changeover control device 60 may be seen in FIG. 3 to have a plurality of dotted lines connecting it to actuators 37, 39, 37', 39', respectively, for selectively switching valves 36, 38, 36', 38'. Changeover control device 60 also has dotted lines connecting it to outlet ducts 40 and 40' from which it responds to pressure buildup in tanks 10, 10', respectively, to switch the valves 36, 38, 36', and 38'. Changeover control device 60 is also connected to actuator 45 to condition four-way valve 44 whereby gas pressure from either outlet duct 40 or 40' may be delivered to supply lines 48, 54 and 56 to drive engine E and permit return of gas from the engine via return lines 58, 59 to inlet duct 46 or 46'. Changeover control device 60 is also connected by a dotted passage to a time delay relay 62 which effects delaying the switching of valve 50 until after sufficient gas pressure has been delivered to supply lines 48, 54, and 56 to drive the engine E so that equalization of pressure between tanks 10 and 10' will not abort delivery of adequate gas pressure for driving the engine E. To maintain optimum operating pressures, a pressure reducing valve 52 is disposed between supply lines 48 and 54.

The system S, as may be seen in FIG. 3, further includes a boiler 63 for supplying hot water through supply duct 64 by way of an inlet duct 65 to a heat exchanger 68 from which water is returned to boiler 63 by way of return line 66. Heat exchanger 68 includes supply pipe 70 and a return duct 32 for circulating hot water to the various units via supply duct 28. To supply cooling medium to the various units, the system S is equipped with a cooling tower 72 having a cold water supply duct 74 connected to a heat exchanger 78 by a supply line 75. The water going into heat exchanger 78 by way of supply line 75 may return to the cooling tower 72 by way of return line 76. To circulate cooling water to the various units, heat exchanger 78 includes a cold water supply pipe 80 connected to cold water supply duct 30 with cold water return duct 34 completing the circuit between the various units and heat exchanger 78. To effect circulation between boiler 63 heat and exchanger 68, system pumps 69 and 73 are provided. To effect circulation of cold water between water tower 72, the heat exchanger 78 and the various units, system pumps 71 and 85 are provided. As an alternative to system pumps 73 and 85, gasoline operated pumps 77 and 79, respectively, are provided to at least effect start up operation. After the operation is started up by gasoline pumps 77 and 79, they may be cut off and operation may then be continued by way of systems pump 73 and 85, respectively. As an alternative to boiler 63, hot water may be supplied from an alternative source such as from a geothermal source via line 82, for example. As an alternative to cooling water from cooling tower 72, cooling water may be supplied from available stream, waterfall, or the like connected to line 84.

Throughout the circuitry of system S as illustrated in FIG. 3, isolation valves X are provided whereby any particular unit may be cut off and isolated, for example, the geothermal source to line 82 or the boiler 63, may be selectively cut off and wherein the line 84 or the cooling tower 72 may be selectively cut off.

PRACTICE OF THE DISCLOSED METHOD BY OPERATION OF THE DISCLOSED SYSTEM

With a suitable mass of gas such as nitrogen introduced into all tanks 10, 10' at station L, 110, 110' at station C, and 210, 210' at station R; with boiler 63 heated to supply hot water at a suitable temperature; with cooling tower operable to supply cold water at a suitable temperature, one may operate system S to practice the disclosed invention by opening the necessary valves X and starting up pumps 77 and 79 to begin pumping hot and cold water to hot fluid supply line 28 and cold fluid supply line 34, respectively. After system S is started up, system pumps 73 and 85 may then take over operation in place of gasoline pumps 77 and 79, respectively. Operation of system S will proceed with hot water being delivered to heat exchanger 18 of tank 10 at station L via hot fluid supply line 28, valve 36, and inlet duct 24 by pump 77 or 73 to heat gas in tank 10 while cold water is being delivered to heat exchanger 18' of companion tank 10' via cold fluid supply line 30, valve 36' and inlet duct 24' by pump 79 or 85 to cool gas in tank 10'. Used hot water will leave heat exchanger 18 through outlet duct 26 and return to boiler 63 via valve 38 and hot fluid return line 32, while used cold water will leave heat exchanger 18' through outlet duct 26' and return to cooling tower 72 via valve 38' and cold fluid return line 34. Up to this point the pressure in tank 10 will be raised by the heat obtained from hot water circulating through heat exchanger 18 and the pressure in tank 10' will be dropped due to the heat rejected to cold water circulating through heat exchanger 18'. When the gas pressures of tanks 10 and 10' reach predetermined differential levels as indicated at gauges 42 and 42', respectively, equalization of pressure between tanks 10 and 10' will be effectd by passage of gas from tank 10 to tank 10' via outlet duct 40, by-pass conduit 51, equalizing valve 50 and inlet duct 46'. Equalizing valve 50, as mentioned heretofore, is controlled by changeover control element 60 which operates in response to pressure differential build-up between tanks 10 and 10' to effect switching of valves 36, 38, 36', 38'. After gas has passed from tank 10, due to pressure increase therein, to tank 10' which then will have a greater mass of gas therein, three way valves 36, 38, 36', 38' will be conditioned by changeover control element so that hot water will be delivered to heat exchanger 18' of tank 10' via hot fluid supply line 28, valve 36', and inlet duct 24' to heat gas in tank 10' and increase the gas pressure thereof, while cold water will at the same time be delivered to heat exchanger 18 of tank 10 via cold fluid supply line 30, valve 36, and inlet duct 24 to cool gas in tank 10 to decrease the pressure thereof. At this time valves 38 and 38' will be conditioned to return used cold water and used hot water, respectively, to boiler 63 and cooling tower 72. After completion of the two stage gas pressure increase of tanks 10, 10' the gas of the second stage increase will be of such pressure and mass as to be suitable for use in engine E and such gas will then be delivered to engine E from tank 10' via outlet duct 40', four way valve 44, as conditioned by changeover control element 60 by means of actuator 45, through supply lines 48, 54 and 56 after which the gas may be returned via return lines 58, 59 and four way valve 44 to inlet duct 46 or 46'.

Operations at stations C and R are similar to that at station L, but are successively at later stages in a three cycle operation to drive three pistons, for example, in engine E.

EXAMPLE OF OPERATIVE PARAMETERS

Although a number of gases may be used with this system, hydrogen is used in the following example:

Assuming the tanks 10, 10' to be 10 cubic ft., then the mass of hydrogen when both tanks are filled to 100 atmospheres 1470 psia may be obtained from the equation:

$$M = (PV/RT),$$

where
 M = Mass
 P = Pressure psia
 R = 767 for hydrogen
 $T_1$, $T_2$ = Temperature in degrees Rankine
With
 $T_1 = 80° F = 540° R$ and
 $T_2 = 200° F = 660° R$ $$M = \frac{(1470) \, 144 \times 10}{767 \, (540)} = \frac{2116800}{} = 5.11 \text{ lb. per tank or } 10.22$$
Total at 80° F (540° R)

$$P = \frac{MRT}{V \times 144} = \frac{5.11 \times 767 \times 660}{10 \times 144}$$
$$= 1796.37 \text{ at } 200° F (660° R)$$

Assuming that tanks 10, 10' are operated with heated fluid and no cooling fluid supplied thereto $$\frac{P_1}{P_2} = \frac{1470}{1796.37} = .8183 = 81.83\%; \frac{P_2}{P_1} = .1817 = 18.17\%$$

Then after equalization of pressure
 M = 8.3630 lb. in tank 10'
 M = 1.857 lb. in tank 10

When tank 10' is then heated to 200° F, the resulting pressure is:

$$P = \frac{MRT}{V \times 144} = \frac{8.3630 \times 767 \times 660}{10 \times 144} = 2939.94 \text{ psia.}$$

The pressure in tank 10 is:

$$P = \frac{MRT}{V \times 144} = \frac{1.857 \times 767 \times 540}{10 \times 144} = 534.12 \text{ psia.}$$
a $\Delta P$ of 2405.82 psia.

If the operational pressure is set at 66% of 2405.82 psia as it may be, then the working pressure is 1587.84 psia rounded off say at 1500 psia, there would then be a working capacity of about 37.37 cubic feet available at 1500 psi differential to drive the engine E.

From page 25 of "Fluid Power" Data Book, of Womack Machine Supply Company, 1971, an air charged hydraulic accumulator subjected to the indicated pressures will produce 60 cubic inches per gallon capacity. Therefore, for a 10 cubic feet capacity that is 4488 cubic inches or 2.59 cubic feet.

$$\frac{X}{767 \, (H)} = \frac{2.59 \, cf}{53.3 \, (air)};$$

solving for X we find X = 37.27. The enthalpy of $H_2$ at 200° F is about 2250 btu/lb and at 80° F it is about 1906, or 2848.32 btu have to be added to raise the 8.28 lb. from 80° F to 200° F. While 667.37 btu must be removed from the 1.94 lb., there is a total of 7031.38 btu heat exchanged per cycle.

If we use the available energy to drive a 3 cylinder engine with 2" diameter pistons with a 2" stroke, turning at 200 rpm, we then have $$I.H.P. = PLAN/33,000$$

where
 P = Pressure psi
 L = Stroke in feet
 A = Area in sq. in.
 N = RPM $$I.H.P. = \frac{1500 \times .1667 \times 3.1416 \times 200}{33,000} = 4.76 \text{ per cyl.}$$

14.28 I.H.P. at 60% efficiency = 8.568 H.P.
This would require 3769.92 cu/in min. of gas or 37.37 cubic feet would run the engine 17.129 min. a total of 24,629 btu must be added and subtracted from the gas.

The foregoing data is given by way of example only and is not to be taken as limiting the operative capabilities of the inventive concept.

Although a single preferred embodiment of the present invention has been illustrated and described herein, it is to be clearly understood that numerous variations or modification thereof may occur to those skilled in the art and that what is intended to be covered herein is not only the illustrated form of the invention, but also any all modified forms thereof as may come within the spirit and scope of said invention.

What is claimed is:

1. A method of delivering gas pressure to drive one or more pistons in an engine or like machine to produce working strokes comprising the steps of:
 (a) establishing a given quantity of gas in a gas flow circuit arrangement;
 (b) introducing substantially equal portions of the gas into each of a first container and a second container;
 (c) developing a change in pressure in at least one of the two equal portions of gas by changing the temperature thereof;
 (d) establishing communication between the first and second containers to allow gas pressure in the separate containers to equalize by an initial flow of gas from the container having a greater pressure to the one having lower pressure after said step (c);
 (e) cutting off communication between the first and second containers after equalizing the pressure therein by said step (d);
 (f) again developing a change in gas pressure in at least one of the first and second containers to cause a relative increase in gas pressure of the container to which gas flowed in said step (d) by changing the temperature in at least one of the first and second containers;
 (g) establishing gas flow communication between the container having greater relative gas pressure after said step (f) and a piston or like driven member of an engine and then back to the container having less relative gas pressure after said step (f) whereby due to such gas flow a working stroke will be imparted to said piston or like driven member.

2. The method according to claim 1 wherein gas flow communication between the container having greater relative gas pressure after said step (f) and the container having lesser relative gas pressure is established in said step (q) only after gas flow is established to effect a working stroke on said piston or like driven member.

3. The method according to claim 1 wherein said step (c) comprises increasing the temperature and therefore the pressure of at least one of the portions of gas which ultimately flows out of its container as a result of increase in pressure to the other container having lower pressure.

4. The method according to claim 1 wherein the said step (c) comprises decreasing the temperature and therefore the pressure of at least of one of the portions of gas the container of which ultimately receives gas flowing from the other container having higher pressure.

5. The method according to claim 1 wherein said step (c) comprises both increasing the temperature of one of the two portions of gas and decreasing the temperature of the other of the two portions of gas whereby gas is caused to flow at a significant rate from the container of the heated gas to the container of the cooled gas.

6. The method according to claim 5 wherein said step (f) comprises increasing the temperature of the gas in the container that was cooled in said step (c) and decreasing the temperature of the gas in the container that was heated in said step (c).

7. The method according to claim 6 wherein gas flowing from the container having greater relative gas pressure in said step (g) to the container having lesser relative gas pressure after said step (f) is initiated only after sufficient gas has flowed to the engine piston to be driven thereby.

8. The method according to claim 7 wherein said steps (f) and (g) are alternately carried out on said first container and on said second container repeatedly.

9. The method according to claim 8 wherein like additional cooperating portions of gas are introduced into additional pairs of separate containers and are subjected to said steps (c) through (g) in timed sequence so that gas flow communication is established between each pair of said containers and piston or like driven member of an engine with continuity.

10. The method according to claim 9 wherein heat is obtained from the atmosphere and directed to a heat exchange medium to carry out said steps (c) and (f).

11. The method according to claim 9 wherein heat is obtained from solar energy and is transmitted to a heating medium to carry out said steps (c) and (f).

12. The method according to claim 9 wherein heat is obtained from a geothermal heat source and is transmitted to a heating medium to carry out said steps (c) and (f).

13. The method according to claim 9 wherein heat is obtained from any known heat source and is supplied to a heating medium to carry out said steps (c) and (f).

14. The method according to claim 13 wherein said step (a) is carried out by using hydrogen gas.

15. The method according to claim 13 wherein said step (a) is carried out by using nitrogen.

16. The method according to claim 13 wherein said step (a) is carried out by using helium.

17. A system in which gas pressure may be developed to efficiently produce working strokes to drive one or more pistons in an engine or like machine, said system comprising:

(a) at least a first gas receiving container and a second gas receiving container of substantially equal capacity, each of said first and second containers having a gas inlet, a gas outlet, a tubular member extending between said inlet and said outlet through which gas may pass, and heat exchange means extending around said tubular member for imposing a temperature change to gas in or passing through said tubular member;

(b) a first and a second duct connected to said heat exchange means of each of said containers through which heat exchange fluid may be introduced and discharged respectively;

(c) a hot fluid supply line and a cold fluid supply line leading to each of said first duct and a hot fluid return line and a cold fluid return line leading from each of said second duct;

(d) an individual supply valve for selectively connecting said hot fluid supply line or said cold fluid supply line leading to the first duct of each of said containers and an individual return valve for selectively connecting said hot fluid return line or said cold fluid return line leading from the second duct of each of said containers;

(e) closed circuit passage means leading from the outlet of each of said containers to one or more piston of an engine and back to the inlet of each of said containers;

(f) a by-pass passage across said closed circuit passage means for connecting the outlet of said first container to the inlet of said second container whereby intercommunication between inlets and outlets of said containers is established;

(g) a pressure equalization valve included in said by-pass passage for selectively establishing communication between the outlet of said first container and the inlet of said second container and by-passing said engine;

(h) said pressure equalization valve being responsive to build-up of pressure to a first predetermined value in one of said containers before opening up said by-pass passage to effect equalization of pressure by allowing flow of gas from the container having higher pressure to the one having lower pressure whereby said container to which gas has flowed will contain a higher mass of gas;

(i) control means for selectively causing the supply and return valves of one of said containers to connect the hot fluid supply line and the hot fluid return line to the first and second ducts thereof respectively to heat the gas therein and increase its pressure while causing the supply and return valves of the other of said containers to connect the cold fluid supply line and the cold fluid return line to the first and second ducts thereof respectively to cool the gas therein and reduce its pressure; and (j) said control means being operable in response to a second predetermined pressure developed in the container having a higher mass of gas to permit this higher mass of gas to flow through said closed circuit passage means to said engine to produce a working stroke therein and back to said containers.

18. The system according to claim 17 wherein said control means includes a time delay relay which opens communication between said first and second containers via said by-pass passage only after sufficient gas has flowed to the piston associated therewith to establish a working stroke thereon.

* * * * *